Patented Aug. 22, 1944

2,356,604

UNITED STATES PATENT OFFICE 2,356,604

COMPOSITION OF MATTER

Roger A. Mathes, Akron, and Paul C. Jones, Silver Lake, Ohio, assignors to The B. F. Goodrich Company, New York, N. Y., a corporation of New York No Drawing. Application October 21, 1941, Serial No. 415,945

10 Claims. (Cl. 260—302)

This invention relates to new compositions of matter and pertains specifically to the reaction products of the mercaptans of heterocyclic nitrogen-containing compounds with aminoalkyl sulfides.

The term "aminoalkyl sulfides" includes not only the aminoalkyl hydrosulfides (or mercaptans) but also the diaminodialkyl monosulfides and polysulfides containing no more than four sulfur atoms. The amino group may have its hydrogen atoms replaced by hydrocarbon groups, such as methyl, ethyl, phenyl, etc. The alkyl chain between the sulfur and nitrogen atoms may contain no more than three carbon atoms, al-

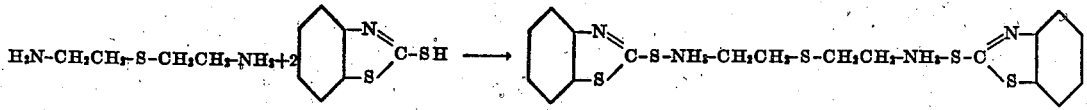

though it may have a hydrocarbon side-chain such as methyl, ethyl, butyl, phenyl, etc. Among the compounds which may be used are 1,1'-diaminodimethyl mono-, di-, or tetrasulfide; 2,2'-diaminodiethyl mono-, di-, or tetrasulfide; 2,2'-diaminodi-n-propyl mono-, di-, or tetrasulfide; 2,2'-diethyl-3,3'-diaminodi-n-propyl mono-, di-, or tetrasulfide; 2,2'-diphenyl-3,3'-diaminodi-n-propyl mono-, di-, or tetrasulfide; 3,3'-diaminodi-n-propyl mono-, di-, or tetrasulfide; N,N'-dimethyl-N,N'-diethyl-2,2'-d i a m i n o d i-n-propyl mono-, di-, or tetrasulfide; aminomethyl mercaptan; 2-aminoethyl mercaptan; 2-amino-n-propyl mercaptan; N-phenyl-2-aminoethyl mercaptan; N,N-dimethyl-2-amino-n-propyl mercaptan; N-ethyl-3-amino-n-propyl mercaptan; N-methyl-N-ethyl-2-a m i n o e t h y l mercaptan; 2-phenyl-3-amino-n-propyl mercaptan; and other similar compounds.

The mercaptans of heterocyclic nitrogen-containing compounds which may be used to produce our new compounds include, among others, the mercaptothiazoles, the mercaptothiazolines, the mercapto-oxazoles, the mercapto-oxazolines, the mercapto-imidazoles, the mercapto-imidazolines, the mercaptothiodiazoles, the mercaptothiazines, the mercaptoquinolines, and the like.

Our new compounds are useful as insecticides, and also as accelerators for the vulcanization of rubber. They are effective as accelerators with any kind of rubber which can be vulcanized with sulfur, such as caoutchouc, balata, gutta percha, latex, artificial rubber isomers, and rubber-like copolymers of conjugated diene hydrocarbons with other copolymerizable monomers, such as copolymers of butadiene with either acrylonitrile, styrene, methyl acrylate, methyl methacrylate, or the like.

The following specific examples will further illustrate our invention.

Example I

A reaction between 6 parts by weight of 2,2'-diaminodiethylsulfide and 16.7 parts by weight of 2-mercaptobenzothiazole is carried out by stirring the reactants together and heating to 100° C. A thin syrup is formed which solidifies at about 75° C. and forms a brittle, friable resin. The reaction probably is as follows:

Example II

About 5 parts by weight of diaminodiethylsulfide is mixed with 12.1 parts of 2-mercapto-4,5-dimethylthiazole. The reaction occurs immediately with the evolution of considerable heat; after heating above the melting point and cooling, a hard cake of the following product is obtained:

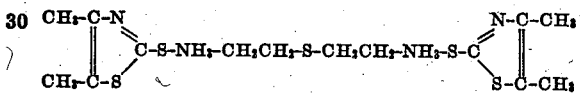

Instead of 2-m e r c a p t o-4,5-dimethylthiazole there may be used 2-mercapto-5-ethylthiazole or any of the other reactants described in the second paragraph, to produce the corresponding products.

Example III

The reaction of Example II is repeated using only 6.05 parts by weight of 2-mercapto-4,5-dimethylthiazole, giving the following product:

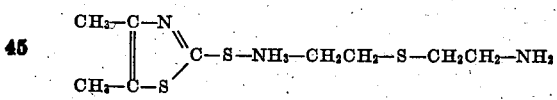

Example IV

A reaction is carried out by mixing 14.5 parts by weight of 2-mercapto-4,5-dimethylthiazole and 7.7 parts of 2-aminoethyl mercaptan. The temperature of the mixture is raised about 10° or 15° C. by the heat of reaction; upon further heating an oil is obtained which solidifies to a soft resin when cooled. The product is believed to have the following structure:

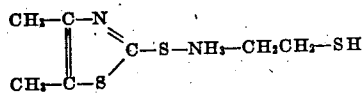

Example V

About 7.7 parts by weight of 2-mercaptobenzothiazole is mixed with 3.8 parts of 2-aminoethyl mercaptan; a rise in temperature of about 10° C. results from the heat of reaction; further heating to 60° C. produces an oil which solidifies to a soft resinous material upon cooling and which has the following structure:

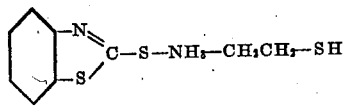

Example VI

There is mixed with 7.6 parts by weight of 2,2'-diaminodiethyl-disulfide about 9.5 parts of 2-mercapto-4,5-dimethylthiazole. After heating to 70° C. a liquid is obtained which solidifies to a sticky mass upon cooling. The product is believed to have the following structure:

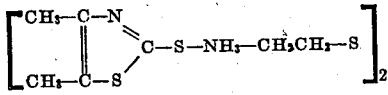

The same procedure, in general, may be used for the synthesis of other similar compounds from such reactants as those enumerated in the second paragraph.

As an indication of the effectiveness of our new compounds in accelerating the vulcanization of rubber, we have prepared the following rubber composition, in which the parts are by weight:

| | |
|---|---|
| Rubber | 100 |
| Zinc oxide | 5 |
| Sulfur | 3 |
| Lauric acid | 1 |
| Accelerator | 1 |

When the products of Examples I to VI above are used as accelerators in this composition, the product, after vulcanization at 287° F. for fifteen minutes, has in each case an ultimate tensile strength of more than 3000 lbs. per sq. in.

The presence of an organic acid such as lauric acid or other fatty acid or a metal salt thereof, although desirable, is not essential. The presence in the rubber composition of any of the usual fillers, pigments, dyes, softeners, antioxidants, other accelerators, and the like has no deleterious effect on our new compounds. Although very small amounts of these compounds produce appreciable effects in rubber compositions, we prefer to use from about 0.5% to 5% or more by weight.

Any of the usual methods of vulcanization, such as heating in a mold, in hot water, steam, hot air, etc., etc., may be employed with rubber compositions containing our new accelerators. The rubber stocks thus produced are not limited in their use, but are applicable to a wide variety of products, such as pneumatic and solid tires, hose, belting, footwear, latex-dipped goods, surgical goods, all varieties of molded products, and the like.

As may be seen from these results, our new compounds are very useful as accelerators for the vulcanization of rubber. Although we have herein disclosed specific embodiments of our invention, we do not intend to limit ourselves thereto, but to include in the appended claims all the obvious variations and modifications.

We claim:

1. A composition of matter comprising the addition product of a mercaptan having the formula ASH where A is a heterocyclic nitrogen-containing group, with an aminoalkyl sulfide which contains no more than four sulfur atoms, and no more than three carbon atoms in the alkyl chain between the sulfur and nitrogen atoms, said aminoalkyl group containing no substituent groups other than hydrogen and hydrocarbon groups.

2. A composition of matter comprising the addition product of a mercaptan having the formula ASH where A is a heterocyclic nitrogen-containing group, with an aminoalkyl mercaptan which contains no more than three carbon atoms in the alkyl chain between the sulfur and nitrogen atoms, said aminoalkyl group containing no substituent groups other than hydrogen and hydrocarbon groups.

3. A composition of matter comprising the addition product of a mercaptan having the formula ASH where A is a heterocyclic nitrogen-containing group, with a di(aminoalkyl) monosulfide which contains no more than three carbon atoms in the alkyl chain between the sulfur and nitrogen atoms, said aminoalkyl group containing no substituent group other than hydrogen and hydrocarbon groups.

4. A composition of matter comprising the addition product of a mercaptan having the formula ASH where A is a heterocyclic nitrogen-containing group, with a di(aminoalkyl) polysulfide which contains no more than four sulfur atoms, and no more than three carbon atoms in the alkyl chain between the sulfur and nitrogen atoms, said aminoalkyl group containing no substituent groups other than hydrogen and hydrocarbon groups.

5. A composition of matter comprising the addition product of a mercaptan having the formula ASH where A is a heterocyclic nitrogen-containing group, with 2-aminoethyl mercaptan.

6. A composition of matter comprising the addition product of a mercaptan having the formula ASH where A is a heterocyclic nitrogen-containing group, with 2,2'-diaminodiethyl monosulfide.

7. A composition of matter comprising the addition product of a mercaptan having the formula ASH where A is a heterocyclic nitrogen-containing group, with 2,2'-diaminodiethyl disulfide.

8. A composition of matter comprising the addition product of 2-mercapto-4,5-dimethylthiazole with 2,2'-diaminodiethyl monosulfide.

9. A composition of matter comprising the addition product of 2-mercapto-4,5-dimethylthiazole with 2-aminoethyl mercaptan.

10. A composition of matter comprising the addition product of 2-mercapto-5-ethylthiazole with 2,2'-diaminodiethyl disulfide.

ROGER A. MATHES.
PAUL C. JONES.